(12) United States Patent
Gill

(10) Patent No.: US 8,254,951 B2
(45) Date of Patent: Aug. 28, 2012

(54) APPARATUS AND METHOD FOR LOCATING MOBILE TERMINALS

(75) Inventor: Trevor Michael Gill, Reading (GB)

(73) Assignee: Vodafone Group PLC, Newbury, Berkshire (GB)

( * ) Notice: Subject to any disclaimer, the term of this patent is extended or adjusted under 35 U.S.C. 154(b) by 951 days.

(21) Appl. No.: 11/875,705

(22) Filed: Oct. 19, 2007

(65) Prior Publication Data

US 2008/0096579 A1    Apr. 24, 2008

(30) Foreign Application Priority Data

Oct. 19, 2006 (GB) .................................. 0620849.0

(51) Int. Cl.
*H04W 24/00* (2009.01)
(52) U.S. Cl. .................. 455/456.1; 455/422.1; 455/425; 455/435.1; 455/41.2
(58) Field of Classification Search ............... 455/422.1, 455/425, 435.1, 456.1, 41.2, 456.6, 456.3
See application file for complete search history.

(56) References Cited

U.S. PATENT DOCUMENTS

| 2002/0094801 A1 | 7/2002 | Atorf |
| 2002/0123840 A1 | 9/2002 | Obata et al. |
| 2004/0152470 A1 | 8/2004 | Spain |
| 2005/0136845 A1 * | 6/2005 | Masuoka et al. ........... 455/67.14 |

FOREIGN PATENT DOCUMENTS

| EP | 1 215 929 | 6/2002 |
| EP | 1 251 711 | 10/2002 |
| EP | 1251711 | * 10/2002 |
| EP | 1612999 | 1/2006 |
| GB | 2329801 | 3/1999 |
| WO | 99/55102 | 10/1999 |
| WO | 00/01171 | 1/2000 |
| WO | WO 00/27152 | * 5/2000 |

OTHER PUBLICATIONS

Youssef et al. (2005) Computing Location from Ambient FM Radio Signals.*

* cited by examiner

*Primary Examiner* — Kamran Afshar
*Assistant Examiner* — Manpreet Matharu
(74) *Attorney, Agent, or Firm* — Workman Nydegger

(57) ABSTRACT

A beacon device is disclosed for transmitting a proximity indication signal. When a mobile terminal is in proximity to the beacon device the mobile device receives the proximity indication signal and transmits a signal indicative thereof to the network with which it is registered in order to receive discounted calls because it is deemed to be within a special zone (such as the house of the user of the mobile terminal. The device is able to detect movement of device and to inhibit generation of the proximity indication signal to the mobile terminal when movement is detected. In order to detect movement, the device includes means for recording the pattern of selected ambient radio signals to derive a typical value range, means for measuring the ambient radio signals to produce a measurement value, means for comparing the measurement value with the value range to determine whether the device has been moved, and means for selectively enabling transmission of a proximity indication signal to the mobile terminal in dependence upon the determination of the comparing means.

16 Claims, 3 Drawing Sheets

APPARATUS AND METHOD FOR LOCATING MOBILE TERMINALS

CROSS-REFERENCE TO RELATED APPLICATION

This application claims priority to United Kingdom Application No. GB0620849.0, filed Oct. 19, 2006, which is incorporated herein by reference in its entirety.

FIELD OF THE INVENTION

The present invention relates to a device for selectively providing a signal receivable by an associated mobile terminal in proximity to the device.

BACKGROUND

It is often desirable to be able to determine the proximity of a cellular or mobile telecommunications terminal to a particular point or location (a "special zone"). For example, some mobile or cellular telecommunications network operators wish to offer subscribers discounted call charges when their mobile terminals are located within a particular area—such as their home or place of work.

Various prior art arrangements for locating a mobile terminal have been proposed.

For example, it is known to use a mobile terminal to monitor the pattern of signals received from various cells of a mobile network and to record these values when the mobile terminal is in a particular location, this location being within the special zone. Subsequently, the mobile terminal measures the ambient radio signals from the cells and compares these with the recorded values. If the measured values are within a certain range of the recorded values, then the mobile terminal is deemed to be within the special zone. This can be signalled to the network in order to allow special calling rates within the zone. However, a problem with such arrangements is that a signal is received from the respective cells can vary significantly within a small area—for example, within a single house. Therefore, in order to ensure that the mobile terminal is deemed to be within this special zone when it is in fact in that zone, the range of differences permitted between the recorded values and the measured values has to be considerable. In practice, this means that the area within which the mobile terminal signals to the network that it is in the special zone is much larger than the special zone.

WO-A-00/01171 discloses an alternative arrangement. In this arrangement a device, which is intended to be located in a fixed position in the special zone, is provided with a short-range beacon, such as a Bluetooth beacon, which transmits a signal that is receivable by the mobile terminal when it is near to the beacon. Receipt of the signal from the beacon is transmitted by the mobile terminal to the mobile network in order that a special charging rate is applied. However, a problem with such systems is that the device containing the beacon can be moved, and the user of the mobile terminal will be able to receive calls at the reduced rate whenever the device containing the beacon is within range of the mobile terminal.

EP-A-1251711 discloses a system in which a device containing a short-range beacon which transmits the signal to a mobile terminal must be connected to a fixed socket, such as a mains power supply, for it to operate. With such an arrangement, it may still be possible for the user to re-locate the device containing the beacon and thereby obtain lower priced calls in an unauthorised manner. There is no way for the network to determine the location of the beacon.

SUMMARY OF EXAMPLE EMBODIMENTS

According to one example embodiment, there is provided a device for selectively providing a signal receivable by an associated mobile terminal in proximity to the device, including means for recording the pattern of selected ambient radio signals to derive a typical value range, means for measuring the ambient radio signals to produce a measurement value, means for comparing the measurement value with the value range to determine whether the device has been moved, and means for selectively enabling a transmission of a proximity indication signal to the mobile terminal in dependence upon the determination of the comparing means.

In the embodiment, the proximity indication signal is transmitted when the comparing means determines that the measured value is within the value range. The proximity indication signal may be transmitted by the device by, for example, Bluetooth. When the mobile terminal is able to receive the proximity indication signal, the mobile terminal then automatically transmits a signal to the network in order to provide the user of the mobile terminal with reduced rate calls.

However, if the comparing means determines that the device has been moved, the proximity indication signal is not transmitted. Therefore, the proximity indication signal is not received by the mobile terminal and reduced rate calls are not provided.

Thus, in the embodiment, the device is able to determine whether it has been moved—typically, in an attempt to obtain reduced rate calls outside the permitted special zone.

The pattern of selected ambient radio signals is recorded to derive the typical value range. By providing a typical value range, some varying of the ambient radio signals as measured by the measuring means is permitted, whilst the comparing means still determines that the device has not been moved. This may, for example, accommodate for legitimate natural variations in the ambient radio signals.

BRIEF DESCRIPTION OF THE DRAWINGS

For a better understanding of the present invention, embodiments will now be described with reference to the accompanying drawings, in which.

DETAILED DESCRIPTION OF SOME EXAMPLE EMBODIMENTS

Figure 1:
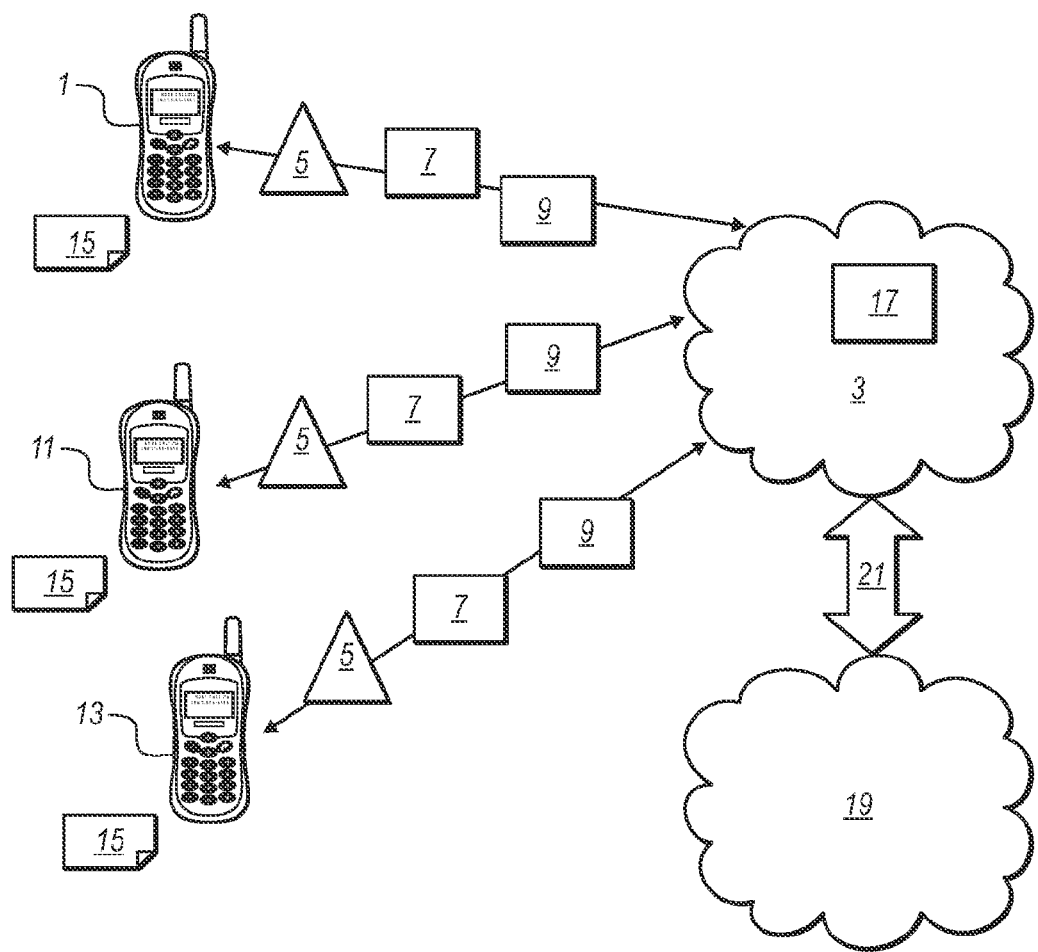
FIG. 1 shows schematically the elements of a mobile telecommunications system.

Hereinafter, aspects of example embodiments of the present invention will be described in detail with reference to the accompanying drawings so that they can be readily implemented by those skilled in the art. In the drawings like elements are generally designated with the same reference signs.

As is well known, for mobile or cellular telecommunications networks, such as GSM and UMTS networks, the geographical area covered by the network is divided into a plurality of small cells. Each cell has its own base station which transmits radio signals to and receives radio signals from mobile terminals within range. The base stations are interconnected, and ultimately connected to the network core, using microwave or cable communication.

In practice, a mobile terminal may detect signals from several base stations. By an exchange of signals between the mobile terminal and the base stations within range in known manner, the terminal and the base stations agree on the most appropriate base station to serve the terminal—typically the base station with the highest received power at the mobile terminal. The arrangements for "handover" from one base station to another, as the mobile terminal moves within the geographical area covered by the network are known to those skilled in the art, and will not be described further in detail here.

In many countries, more than one mobile or cellular network is provided, each of which has its own radio access network comprising base stations.

This and other known aspects of a conventional mobile or cellular network will now be briefly described with reference to FIG. 1.

FIG. 1 shows schematically a network in which the invention may be used. The figure shows a cellular network. Mobile terminal 1 is registered with GSM/GPRS or UMTS (3G) mobile telecommunications network 3 (although the invention is also applicable to other communications networks, such as CDMA 2000). The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals is registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet 19 via an appropriate link 21. A multiplicity of terminals are connected to the Internet (by fixed or wireless links), and a PC terminal 23 and a PDA terminal 25 are shown by way of example.

Each of the mobile terminals 1, 11 and 13 is provided with a respective subscriber identity module (SIM) 15.

The SIM 15 used by the terminal 1,11,13 may be a SIM of the type defined in the GSM or UMTS standards specifications.

The network shown in FIG. 1 comprises both the mobile telecommunications network 3 and the Internet 19 (which itself comprises a multiplicity of other networks).

Figure 2:
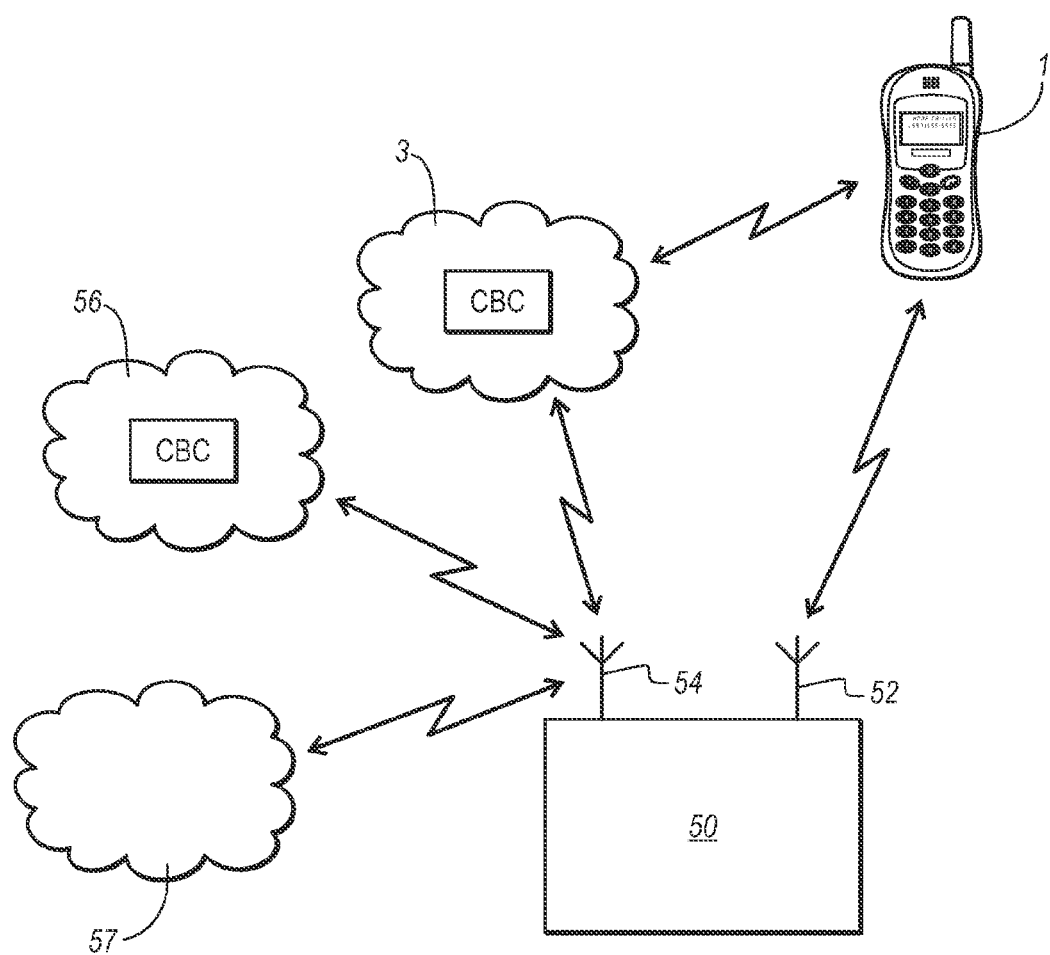
FIG. 2 shows schematically a device for reporting the proximity of an associated mobile terminal, the mobile terminal and sources of ambient radio signals.

Referring to FIG. 2, the network 3 wishes to provide the user of mobile terminal 1 with reduced price calls when the mobile terminal 1 is within a special zone—typically the user's home. In order to do this, the mobile network 3 provides the user with a beacon device 50. The user of the beacon device 50 is instructed to install the device within the special zone (typically their home) where they wish to receive reduced price calls.

A beacon device 50 is shown in FIG. 2. The beacon device 50 comprises a beacon antenna 52 which is capable of transmitting a proximity indication signal (to be described further later) to mobile terminal 1 over a short range—for example, 50 metres. The proximity indication signal may be transmitted by Bluetooth or some other short range transmission mechanism.

The beacon device 50 includes a second, GSM antenna 54 for receiving ambient radio signals—in the embodiment the ambient radio signals received are signals from the base stations 5 of the network 3 that are within range. The antenna 54 may also receive signals from the base stations of another cellular or mobile networks 56 and 57.

Figure 3:
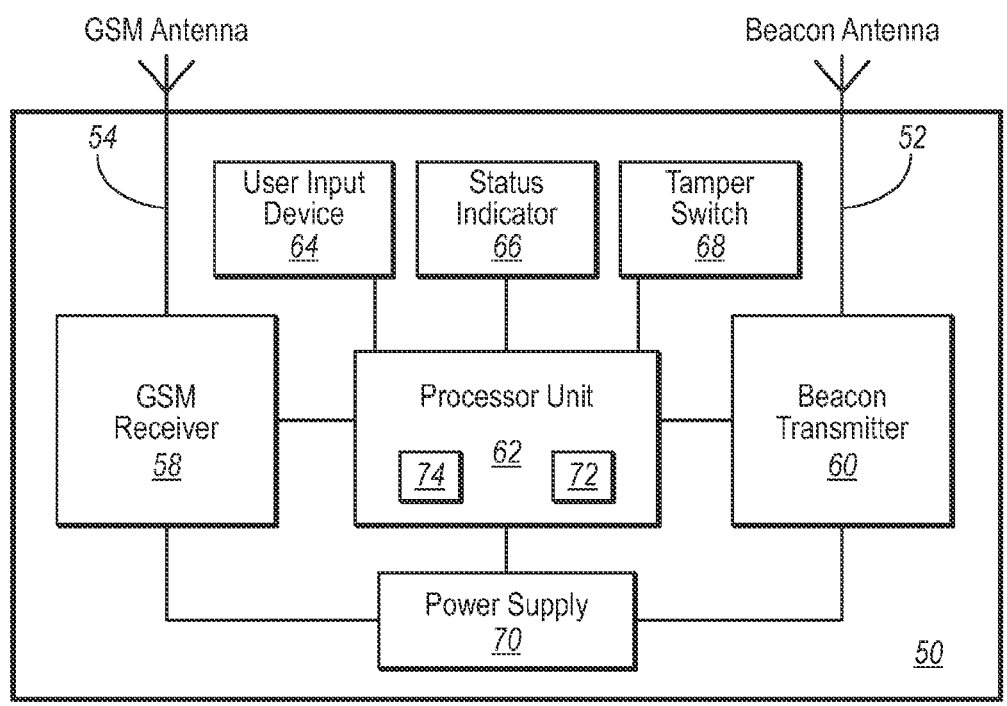
FIG. 3 shows schematically the functional elements of the device.

Referring now to FIG. 3, the beacon device 52 comprises, in addition to beacon antenna 52 and GSM antenna 54, GSM receiver 58 for receiving and interpreting signals received by the GSM antenna 54. Beacon transmitter 60 generates signals for transmission by beacon antenna 52. Operation of the beacon device 50 is controlled by processor unit 62, which processes information received from the GSM receiver 58 and uses this to control a transmission of the proximity indication signal, which is generated by the beacon transmitter 60.

Additionally, the beacon device 50 includes user input device 64, comprising, for example, one or more push button switches for selecting functions, such as location locking—to be described in more detail below. The beacon device 50 further comprises status display 66, which may comprise one or more LEDs or a small LCD display, which is used to indicate the status of the device 50, such as "awaiting installation", "locked in position", "in normal operation" or "inactivated due to unauthorized movement". Tamper switch 68 is triggered if an attempt is made to open the case of the beacon device 50. If tampering is detected by the tamper switch 68, a signal is sent to the processing device 62 which causes the processing unit 62 to erase selected information from its non-volatile memory in order to permanently prevent operation of the beacon transmitter 60, and therefore transmission of the proximity indication signal. The user input device 64 and the user status indicator 66 are both connected to the processor unit 62 for transmitting signals representative of user inputs to the processor unit 62 and to receive data for display from the processor unit 62, respectively.

The beacon device 50 will typically be supplied by the operator of network 1 to the user of mobile device 3 when that user subscribes to a tariff that provides reduced price calls when in a special zone.

At this point the beacon device 50 will be in the "awaiting installation" mode. Typically, the beacon device 50 will be connected to mains power, although it may be powered by an electrical cell. The power supply 70 then provides power to the processor unit 62, GSM receiver 58 and beacon transmitter 60. The "awaiting installation" mode is indicated on the status indicator 66. The user is then prompted to use the user input device 64 to initiate location locking.

When this occurs the processor unit 62, in response to receipt of the signal from the user input device 64 indicating that location locking has been selected, activates the GSM receiver 58, which then scans the GSM band using the GSM antenna 54. Preferably, the GSM receiver 58 scans for signals from the network 1 with which the mobile terminal 3 is registered and also other networks within range. The processor unit periodically records the identity and signal strength of the received signals, in recording store 72.

As indicated above, if the networks 1, 56 and 57 are GSM or UMTS networks, signals may be received from respective base stations within range which correspond to respective cells within the networks. The recording store 72 may store the signal strengths of respective cells from networks 1, 56 and 57 in the manner as shown in table 1 below.

TABLE 1

|  | Signal Strength | | | | | |
|---|---|---|---|---|---|---|
|  | Network 1 | | | Network 2 | | Network 3 |
|  | Cell 1 CGI 1542 BCCH AFRCN 7 | Cell 2 CGI 1543 BCCH AFRCN 6 | Cell 3 CGI 1544 BCCH AFRCN 5 | Cell 1 CGI 2015 BCCH AFRCN 1 | Cell 2 CGI 2016 BCCH AFRCN 2 | Cell 1 CGI 3111 BCCH AFRCN 9 |
| Time = x (mins) | | | | | | |
| x | 10 | 5 | 15 | 1 | 20 | 5 |
| x-10 | 11 | 4 | 17 | 8 | 20 | 4 |
| x-20 | 10 | 6 | 12 | 9 | 21 | 6 |
| x-30 | 12 | 4 | 9 | 12 | 20 | 4 |
| ... | | | | | | |
| x-200 | 9 | 7 | 16 | 10 | 20 | 7 |
| Max value | 12 | 7 | 16 | 12 | 21 | 7 |
| Min value | 9 | 4 | 9 | 7 | 20 | 4 |
| Difference (DR) | 3 | 2 | 7 | 5 | 1 | 2 |
| Mean value (AR) | 10.4 | 5.2 | 13.8 | 9.2 | 20.2 | 5.2 |

CGI = Cell Global Identity
BCCH AFRCN = Broadcast Control Channel Absolute Radio Frequency Channel Number The Cell Global Identity (CGI) and Broadcast Control Channel Absolute Radio Frequency Channel Number (BCCH AFRCN) are recorded in memory 72 for each cell.

The signal strength of each of the cells of the networks 1, 56 and 57 are recorded in the memory 72 at 10 minute intervals over a 200 minute period. After that 200 minute period the maximum received value for each cell and the minimum received value for each cell are determined and the difference (DR) between the minimum and the maximum value for each cell is recorded. Also, the mean value (AR) of the signal strengths is determined. Example values are shown in table 1 above.

After the values have been sampled over the 200 minute period, the processor unit 62 is able to selectively generate the proximity indication signal for transmission by the beacon transmitter 60 and beacon antenna 62. That the location locking phase has been completed may be indicated to the user on status indicator 66.

As indicated earlier, the signals received from the cells of the networks 1, 56 and 57 will vary due to changes in the atmospheric conditions, and due to people or objects moving in the vicinity of the beacon device 50. In order to accommodate such variations that occur gradually over a period of time, after the initial location locking stage, processor unit 62 continues to receive from GSM receiver 58 signal strength signals from each of the networks 1, 56 and 57 and to store these in the store 72. The new value overwrites the oldest value ("x-200") in the store 72, and the maximum value, minimum value, difference and mean value are recalculated at each 10 minute interval. This process is continually repeated at 10 minute intervals, with always the oldest value stored in the store 72 being overwritten by the newer signal strength values. Thus the signal strength values are stored on a first in first out (FIFO) basis. In this way, the maximum value, minimum value, difference and mean values will change to represent the current radio conditions over the previous 200 minute period.

In addition to receiving and storing in recording store 72 signal strength measurements from GSM receiver 58 at 10 minute intervals in the manner described above and shown in table 1 above, the processing unit also stores in a second, measuring store 74 the values of the signal strength from networks 1,56 and 57 at 1 minute intervals. After an initial 10 minute period, each of the memory locations y, y−1, ..., y−10 is populated with a signal strength value for each cell of the networks 1, 56 and 57. Signal strength values are continually measured at 1 minute intervals by the processor unit 62 and GSM receiver 58, and the most recently received values are over-written over the oldest value in the store 74—("y−10") after the first 10 minutes. Thus, the signal strength values are stored in a first in first out (FIFO) basis. After the signal strength values are recorded each minute, the mean value (AM) of the last ten signal strength measurements for each cell is calculated and stored in the store 74.

The Cell Global Identity (CGI) and Broadcast Control Channel Absolute Radio Frequency Channel Number (BCCH AFRCN) are recorded in store 74 for each cell.

Table 2 below shows example values stored in the store 74.

TABLE 2

|  | Signal Strength | | | | | |
|---|---|---|---|---|---|---|
|  | Network 1 | | | Network 2 | | Network 3 |
|  | Cell 1 CGI 1542 BCCH AFRCN 7 | Cell 2 CGI 1543 BCCH AFRCN 6 | Cell 3 CGI 1544 BCCH AFRCN 5 | Cell 1 CGI 2015 BCCH AFRCN 1 | Cell2 CGI 2016 BCCH AFRCN 2 | Cell 1 CGI 3111 BCCH AFRCN 9 |
| Time = y (mins) | | | | | | |
| y | 10 | 5 | 15 | 7 | 20 | 5 |
| y-1 | 11 | 5 | 16 | 8 | 19 | 4 |
| y-2 | 8 | 6 | 14 | 9 | 21 | 6 |
| y-3 | 10 | 4 | 9 | 10 | 18 | 4 |
| ... | | | | | | |
| y-10 | 9 | 7 | 16 | 10 | 20 | 7 |
| Mean value (AM) | 9.6 | 5.4 | 14 | 8.8 | 19 | 5.2 |

Each minute, after updating measurement store 74 and recording store 72 (if appropriate), the processing unit 62 performs the following calculation for each cell of each network:—

IF (AR−DR)<AM AND (AR+DR)>AM THEN set proximity indication=1

ELSE set proximity indication=0

Thus, each minute a determination is made whether the mean value stored in the measuring store 74 over a 10 minute period is within a particular range of values recorded in the recording store 72 over a 200 minute period, this range being the mean value recorded over that 200 minute period+/− the difference between the highest value and the lowest value recorded. This comparison is made for each cell of the networks 1,56 and 57.

If all the comparisons are within the specified range (proximity indication=1), then the processing unit 62 can assume that the beacon device 50 has not been moved. The processor unit 62 then instructs the beacon transmitter 60 to transmit the proximity indication signal to the mobile terminal 1 via the antenna 52.

Thus, while the processor unit 62 sets the proximity indication value to 1 for all the cells, it transmits a signal to the beacon transmitter 60 to transmit a proximity indication value by the Bluetooth antenna 52, which is receivable by the mobile terminal 1 when within range of this transmission. The reception of this signal is transmitted from the mobile terminal 1 to the network 3 over the air as part of the signalling exchange continually occurring between the mobile terminal 3 and the network 1. Receipt of this signal is used by the network 3 to provide discounted calls only while the signal is indicated to have been received by the mobile terminal 1.

Although the scheme described above does allow considerable variation in the signal strength of each cell by virtue of the averaging processes and difference measurements made as set out in tables 1 and 2, it may be desirable to accommodate further variations in the signals received from the networks, 1,56 and 57. This could be done, for example, by allowing a certain proportion, for example 10%, of the cell signal strengths to be out of range (proximity indication=0) and for the processor unit 62 still to consider the beacon device 50 to have not been moved.

Additionally, or alternatively, the processor unit 62 could take into account the respective networks from which the signal strength values are received. If the signal strength values from the cells of a single network only are out of range, but of the signal strength values of the other networks are within range, then the processor unit could intelligently conclude that adjustments to that network are being made by the network operator, and to allow the proximity indication value to still be run for a limited period of time—for example, four hours, in order to allow the recording store 72 to record in each of the locations values representative of the new network signal strengths.

Alternatively, the beacon device 50 could be advised of impending changes to the networks 1,56 or 57 by a transmission of a cell broadcast message to the GSM receiver 58 on a selected channel, which message is interpretable by the processor unit 62. On receipt of such a message, the processor unit 62 could ignore the signal strength values received from a particular network for the purposes of determining the proximity indication value for a time period indicated in the message. The signal strength values for that network would continue to be measured and stored in the recording store 72, so that, when signal strength values of that network are again taken into account, representative values for the past 200 minutes will have been stored for use by the processor unit 62. A network event that might cause suppression of the signal strength values of a network might be a broadcast control channel (BCCH) retune.

The cell broadcast mechanism will be well known to those skilled in the art. Briefly, it is a mechanism for simultaneous delivery of messages to multiple devices within a specified cell or cells. Full details of cell broadcast can be found in Phase 2 of GSM standard 03.49, which is hereby fully incorporated by reference. GSM receiver 58 can be configured to listen for cell broadcast messages on a particular channel. Typically, the cell broadcast messages will be received only from the network 3 with which the mobile terminal 1 is registered. However, the operators of networks 56 and 57 may cooperate with the network operator 3 to provide that network operator with the times when they anticipate making significant changes to their networks (such as a BCCH retune). Alternatively, the GSM receiver 58 could be configured to receive cell broadcast messages from each of the networks 1,56 and 57.

If any details of significant changes to the network 3 with which the mobile terminal 1 is registered will be available to the beacon device 50, that device could be configured to allow greater variations in the values of networks 56 and 57 than for the network 3.

A cell broadcast message received by the GSM receiver 58 could also be used to vary the algorithm used to select when the proximity indication value will be set to 1 or 0—for example to make the beacon device more or less sensitive to variations in any one of or all of the networks 1,56 and 57.

If the beacon device 50 were moved or deactivated, then reactivation may be permitted. For example, the user might be allowed a limited number of occasions to return the beacon device 50, after moving it, to its original position and to perform again the initiate location locking function. Also, the user might be required to contact the operator of network 1 to be supplied with the reset code to be entered by the user input device 64 before the initiate location locking function can be performed again. Alternatively, the user might be required to contact the operator of network 1, and then the operator 1 might issue a command by cell broadcast over the GSM network to the GSM receiver 58 to prompt the processor unit 62 to then automatically perform the initiate location locking function.

The user of the mobile terminal 1 and beacon device 50 will generally not be aware of the range of variation of signals strengths that will be permitted at any one time. Therefore, although some movement of the beacon device 50 may not result in the proximity indication value being set to zero, the user will not know the amount of movement that will be permitted. This will generally cause the user not to attempt to move the beacon device 50.

As an alternative to the scheme described above with reference to Table 1 and 2, a different scheme may be used. In this alternative embodiment the recording store 72 stores N (typically 20) signal strength samples at time interval T (typically 5 minutes)—that is, 20 samples are taken, each representative of a successive 5 minute time period. Each of the N signal strength samples is calculated by measuring within the time interval T the signal strength value at time interval t (typically 10 seconds). Each of the N signal strength samples comprises the mean signal strength value of the signal strength values measured at time intervals t, the maximum value of the signal strength values measured at time intervals t and the minimum signal strength value of the signal strength values measured at time intervals t. Thus, for each sample N, over a 5 minute period, the signal strength of each cell is sampled at 10 second intervals. Thirty signal strength values will be obtained in the 5 minute interval for each cell. The maximum value, the minimum value, and the mean value of these thirty sampled values will then be calculated and stored for sample N=1. This is shown in relation to Cell 1 of Network 1 in Table 3 below. After the first 5 minute interval T, similar signal strength measurements and calculations are made for the second sample N=2.

The values for each cell are measured/calculated. This procedure is repeated until 20 samples (N1, N2, . . . , N20) have been taken. After the twentieth sample has been taken, the next sample is over-written over the oldest sample (that is, the samples are taken on a first in first out (FIFO) basis).

TABLE 3

| | | | Signal Strength | | | | | |
|---|---|---|---|---|---|---|---|---|
| | | | Network 1 | | | Network 2 | | Network 3 |
| Sample N | Time T = 5 mins | Time t = 10 secs | Cell 1 CGI 1542 BCCH AFRCN 7 | Cell 2 CGI 1543 BCCH AFRCN 6 | Cell 3 CGI 1544 BCCH AFRCN 5 | Cell 1 CGI 2015 BCCH AFRCN 1 | Cell2 CGI 2016 BCCH AFRCN 2 | Cell 1 CGI 3111 BCCH AFRCN 9 |
| 1 | Max value | 1 | 12 | 10 | | | | |
| | value | 2 | | 11 | | | | |
| | Min value | 3 | 8 | 12 | | | | |
| | value | 4 | | 9 | | | | |
| | Mean value | ... 30 | 8.4 | ... 8 | | | | |
| 2 | | | | | | | | |
| 3 | | | | | | | | |
| 4 | | | | | | | | |
| ... | | | | | | | | |
| 20 | | | | | | | | |

The second store 74 contains a reference pattern of signal strength values, set up when the beacon device 50 is initiated. Rules are then applied by the processor unit 62 which continually determine whether the current pattern of the N samples is close enough to the reference pattern for the processor unit 62 to cause the beacon transmitter 60 to transmit the proximity indication signal from the beacon antenna 52.

The rules may also determine whether any differences between the measured pattern of the N samples and the reference pattern are "partial". For example, the rules may determine whether the sampled values for some of the cells are not close to the reference pattern, whereas the sample values for the other cells are close to the reference pattern. This might occur when a new cell is activated or when a cell is temporarily disabled. If the rules determine that such a partial change has occurred, the processor unit 62 may still instruct the beacon transmitter 60 to cause the beacon antenna 52 to transmit the proximity indication signal because the relationship between the current pattern and the reference pattern does not indicate that the beacon device 50 has been moved. If it is determined that there are partial changes to the current pattern, the processor unit 62 may then set up a new reference pattern, representing the current radio conditions, so that the system adapts to the new radio conditions.

However, if the difference between the current pattern and the reference pattern is significant—for example because the signal strength calculations/values of the N samples from different cells vary significantly with respect to the reference pattern—the processing unit 62 would cause the beacon transmitter 60 to stop transmitting the proximity indication signal from the beacon antenna 52.

Various other schemes for determining whether the beacon device 50 has been moved by sampling the cell signal strengths and making calculations therefrom could also be used in accordance with the invention.

Although the embodiment measures and records the value of signal strengths from base stations of a mobile network, it should be appreciated that any ambient radio signals could be measured—for example, FM or AM radio station signals, television signals, etc.

The present invention may be embodied in other specific forms without departing from its spirit or characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A device for selectively providing a signal receivable by an associated mobile terminal in proximity to the device when the device has not been moved from a predetermined location, comprising:
    means for recording a pattern of selected ambient radio signals to derive a value range, the ambient radio signals being recorded during a first time period from selected ambient radio signals belonging at least to a mobile telecommunications network to which the associated mobile terminal subscribes, the value range indicating a range of signal strengths of the selected ambient radio signals over the first time period;
    means for measuring the selected ambient radio signals to produce a measurement value during a second time period, the measurement value indicating a specific signal strength of the selected ambient radio signals at the second time period;
    means for comparing the measurement value with the value range to determine whether the measurement value is included in the value range, wherein having the measurement value be found within the value range is indicative that the device has not been moved from the predetermined location and having the measurement value not be found with the value range is indicative that the device has been moved from the predetermined location; and
    means for selectively enabling transmission of a proximity indication signal to the mobile terminal in dependence upon the determination of the comparing means.

2. The device of claim 1, wherein the proximity indication signal is only transmitted when the measurement value is within the value range.

3. The device of claim 1, wherein the signal is transmitted by Bluetooth.

4. The device of claim 1, wherein said ambient radio signals are signals from more than one mobile telecommunications networks.

5. The device of claim 4, wherein the ambient radio signals are signals from one or more base stations of said more than one more mobile telecommunications networks.

6. The device of claim 4, adapted to receive and interpret information from at least one of the mobile telecommunications networks relating to the ambient radio signals and for modifying how the typical value range is derived in dependence thereon.

7. The device of claim 4, adapted to selectively temporarily ignore signals from one of the mobile telecommunications networks.

8. The device of claim 1, wherein the mobile terminal is adapted to receive the proximity indication signal.

9. The device of claim 8, wherein the mobile terminal is operable to transmit a message to a mobile telecommunications network with which it is registered while said proximity indication signal is received.

10. A method for selectively providing a signal receivable by an associated mobile terminal in proximity to a beacon device, the method including:
    recording a pattern of selected ambient radio signals to derive a value range, the ambient radio signals being recorded during a first time period from selected ambient radio signals belonging at least to a mobile telecommunications network to which the associated mobile terminal subscribes, the value range indicating a range of signal strengths of the selected ambient radio signals over the first time period;
    measuring the selected ambient radio signals to produce a measurement value during a second time period, the measurement value indicating a specific signal strength of the selected ambient radio signals at the second time period;
    comparing the measurement value with the value range to determine whether the measurement value is included in the value range, wherein having the measurement value be found within the value range is indicative that the device has not been moved from the predetermined location and having the measurement value not be found with the value range is indicative that the device has been moved from the predetermined location; and
    selectively enabling transmission of a proximity indication signal to the mobile terminal in dependence upon the determination of the comparison step.

11. The method of claim 10, further including transmitting the proximity indication signal is only when the measurement value is within the value range.

12. The method of claim 10, wherein said ambient radio signals are signals from more than one more mobile telecommunications networks.

13. The method of claim 12, further including: receiving information from at least one of the mobile telecommunications networks relating to the ambient radio signals; interpreting said information; and modifying how the typical value range is derived in dependence thereon.

14. The method of claim 12, further including selectively and temporarily ignoring signals from one of the mobile telecommunications networks.

15. The method of claim 10, wherein the first time period is 10 minutes and the second time period is 1 minute.

16. The method of claim 10, wherein the first time period is 5 minutes and the second time period is 10 seconds.

* * * * *